May 19, 1964 M. J. CAPARONE ET AL 3,133,556

CONTROL DEVICE

Original Filed April 7, 1959

United States Patent Office 3,133,556
Patented May 19, 1964

3,133,556
CONTROL DEVICE
Michael J. Caparone, Arcadia, and Theodore J. Dyzkeul, Rolling Hills, Calif., assignors to Robertshaw Controls Company, a corporation of Delaware
Continuation of application Ser. No. 804,748, Apr. 7, 1959. This application June 6, 1962, Ser. No. 200,473
4 Claims. (Cl. 137—505.39)

This invention relates to a gaseous fuel control having in combination a safety pilot valve, a manually operable gas cock, a thermostatic valve, and a pressure regulator. More particularly, this invention relates to the combination of the pressure regulator and a precise adjustment device therefor in the control in a manner which simplifies assembly, improves performance, and provides a compact unit.

This application is a continuation of our copending application Serial No. 804,748, filed April 7, 1959, now abandoned.

In the past, pressure regulators have been separate units disposed in the gas supply line either before or after the control which included a safety pilot valve, a manual valve, and a thermostatic valve. In the case where a separate regulator is installed upstream of the control, the regulator valve approaches full closure when the thermostatic valve is closed and pilot gas only is being regulated. When the thermostatic valve opens, there is a tendency for the pilot to be temporarily starved of gas before the regulator responds.

On the other hand, when a separate regulator is installed downstream of the control, the regulator valve is wide open when the thermostatic valve is closed. When the thermostatic valve opens under this condition, there is an initial surge of gas to the main burner before the regulator resumes regulation. Some attempts have been made to resolve these defects by incorporating the pressure regulator into the control, however, bulky and expensive controls have resulted.

An object of this invention is to position the pressure regulator downstream from the manually operable gas cock so that pilot gas is not regulated.

Another object of this invention is to subject the regulator to inlet pressure to hold the regulator valve in a closed position when the thermostatic valve is closed. thereby causing a delaying action of gas input on the opening of the thermostatic valve to avoid an excessive surge of gas to the main burner before the regulator resumes regulation.

Another object of this invention is to dispose a regulating spring in juxtaposed relation to the pressure regulator so as to obtain improved regulating properties due to the use of a long, corresponding low-rate, regulating spring without increasing the dimensions of the control.

Still another object of this invention is to provide a smooth-walled regulator adjustment housing having a non-rotatable adjustment member whereby regular response to spring adjustment is obtained.

These and other objects and advantages will become apparent from the following detailed description taken in connection with the accompanying drawings wherein.

Figure 1:
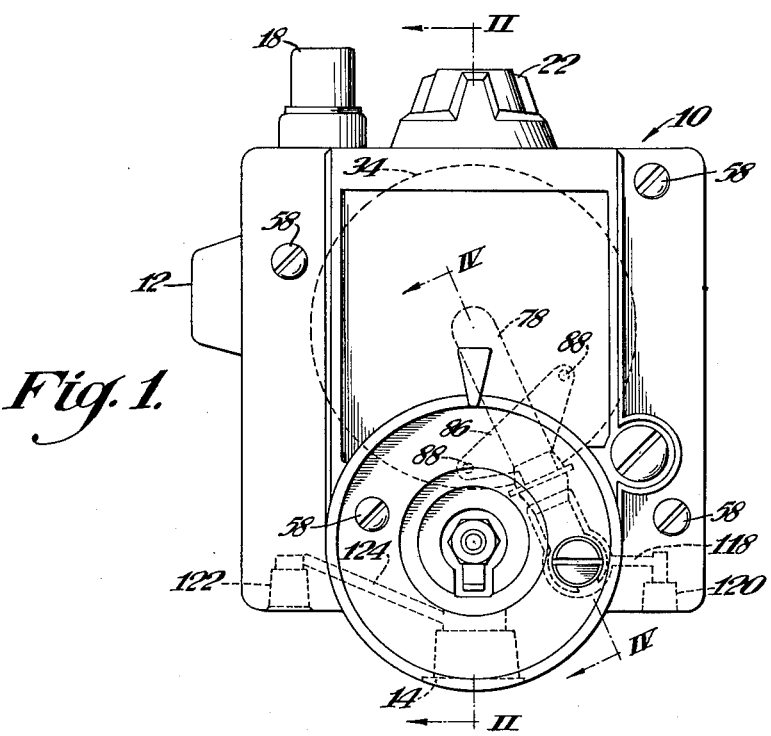
FIG. 1 is a front elevation of the control device embodying this invention with the temperature control knob removed.
Figure 2:
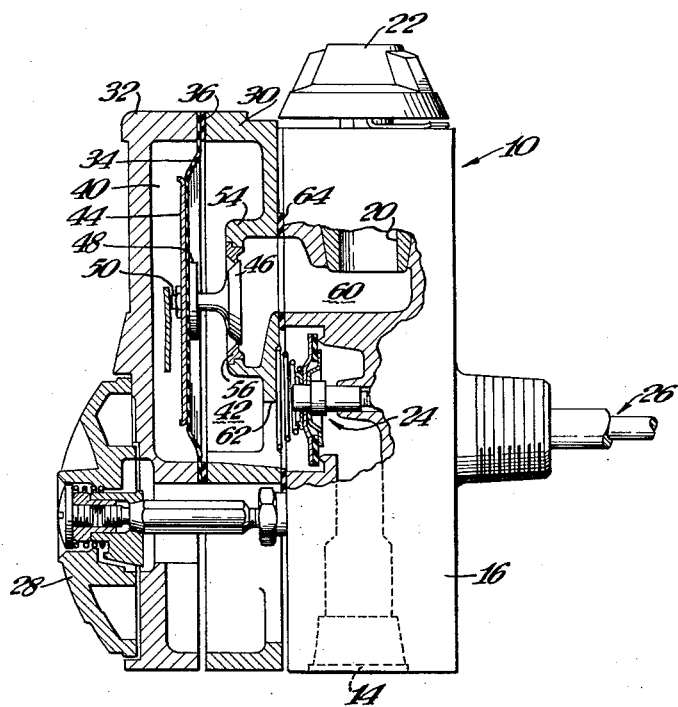
FIG. 2 is a partial sectional view taken on lines II—II of FIG. 1.
Figure 3:
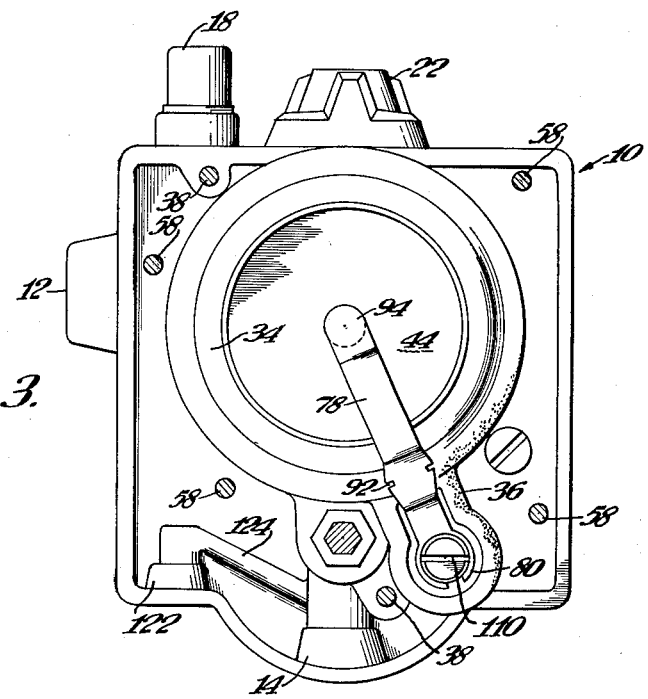
FIG. 3 is a front elevation similar to FIG. 1 with the cover removed and with the regulator lever shown in its proper position on assembly.

In one preferred embodiment of this invention, a casing having a manually operable valve controlling fluid flow to a main burner and a pilot burner and a thermostatically operated valve also controlling the main burner fluid flow, is provided with a pressure responsive valve regulating the fluid flow to the thermostatically operated valve. Lever means extends from the top of the pressure responsive valve to the side thereof. A pressure regulating spring extends parallel to the pressure responsive valve and engages the lever to control the movement of the pressure responsive valve. Since the pressure regulating spring is parallel to the pressure responsive valve, rather than in axial alignment therewith, a long, low-rate regulator spring may be employed to accomplish precise valve regulation without increasing the control thickness.

A chamber having a keyway formed in the wall thereof is provided for housing the regulator spring. An adjustment screw is rotatably mounted in the chamber and has a movable means threadedly connected thereto. The movable means forms a base for the free end of the regulator spring. A key extends from the movable means and cooperates with the keyway to prevent rotation of the movable means. Hence, the movable means moves longitudinally in response to rotation of the adjustment screw to vary the bias of the regulator spring on the lever means. Since the movable means merely moves longitudinally and does not rotate, the regulator spring is not torsionally stressed and accurate adjustment is attained. The walls of the chamber are smooth and the arrangement is such that the regulator spring is freely adjusted without snagging on irregularities disposed in the chamber.

Referring more particularly to the drawings, a fluid flow control device 10 having an inlet 12 and an outlet 14 is provided in the fuel supply line of a water heater or the like. The control device 10 comprises a basic casing 16 housing the conventional control elements. These conventional control elements include a thermoelectrically operated safety valve (not shown) having a manual reset button 18, a gas cock 20, and a thermostatically operated valve 24. The gas cock 20 is provided with a dial 22 for manual operation thereof and contains appropriate openings for controlling fluid flow to the main burner of the water heater and also for controlling fluid flow to a pilot burner for the main burner. The thermostatically operated valve 24 is operable between open and closed positions in response to a predetermined temperature sensed by a rod and tube assembly 26 of a type well known in the art. A manually operable knob 28 is provided on the front of the control device 10 and is rotatable to select the sensed temperature at which the valve 24 will operate.

Regulating means is provided for the fluid flow between gas cock 20 and the thermostatically operated valve 24. To this end, a subassembly is provided comprising a valve seat section 30 and a cover section 32. A circular diaphragm 34 and a gasket 36 are disposed between the valve seat section 30 and the cover section 32 and a pair of screws 38 hold the sections together to compress the gasket and the circumferential edge of the diaphragm 34 to form a fluid-tight connection. The diaphragm 34 forms a partition between the valve seat section 30 and the cover section 32 to define a chamber 40 above the diaphragm and a chamber 42 below the diaphragm. The diaphragm 34 is of a flexible material non-permeable to gas and a circular diaphragm pan 44 having a smaller diameter than the diameter of the diaphragm 34 is positioned thereabove.

A valve member 46 is provided with a circular shoulder 48 disposed on the stem thereof and a threaded portion 50 extends from the central portion of shoulder 48 through apertures disposed centrally in the diaphragm 34 and the diaphragm pan 44. A nut 52 is tightened on threaded portion 50 to fasten the valve member 46 to the diaphragm 34 in a fluid-tight manner. The valve seat section 30 is provided with an upwardly extending hollow boss 54 and a circular valve seat 56 is press-fitted thereto and staked into place. The valve seat 56 has a smaller diameter than valve member 46 and is cooperable therewith to regulate fluid flow through the control 10.

The subassembly is connected to the basic casing 16 by screws 58 extending through the cover section 32 and the valve seat section 30 into the basic casing 16. This aligns the passage within boss 54 with a passage 60 leading from the open end of gas cock 20. It is now apparent that fluid flow from the gas cock 20 must flow through valve seat 56, lower chamber 42, and an opening 62 formed in the valve seat section 30 adjacent boss 54 before reaching the thermostatically operated valve 24 and subsequently outlet 14. A suitable gasket 64 is compressed between valve seat section 30 and basic casing 16 to prevent external leakage and internal leakage between the separate passageways.

Figure 4:
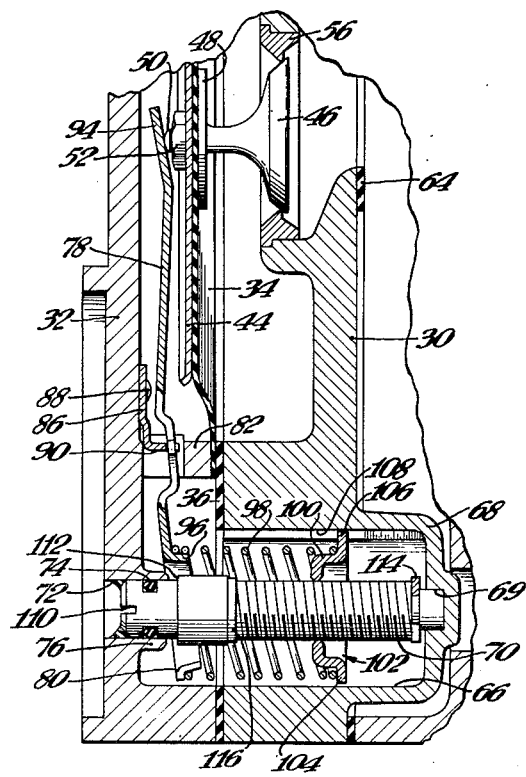
FIG. 4 is an enlarged partial sectional view taken on lines IV—IV of FIG. 1.

Valve seat section 30 and cover section 32 provide a housing forming a substantially cylindrical smooth-walled adjustment chamber 66 disposed in juxtaposed relation with valve member 46 (see FIG. 4). A projecting portion 68 of the valve seat section 30 extends into a matching cavity in the basic casing 16. The projecting portion 68 is provided with a centrally disposed recess 69 and an adjustment screw 70 has one end pivotally mounted therein. The adjustment screw 70 extends along the longitudinal axis of chamber 66 and has the other end positioned within the cylindrical aperture 72 formed in the cover section 32 beneath the temperature adjustment knob 28. An annular groove is provided in the adjustment screw 70 and a sealing ring 74 is positioned therein for cooperation with the internal portion of an apertured boss 76 extending inwardly from the cover section 32.

A first order lever 78 is provided with a semi-circular slotted end 80 which aids assembly of the lever in cover section 32 to a position wherein end 80 substantially encircles boss 76 and adjustment screw 70. A wall 82 of the cover section 32 is adapted to separate the upper diaphragm chamber 40 from the adjustment chamber 66 and is provided with an opening 84 through which lever 78 extends. A substantially triangular-shaped member 86 is fastened to the cover section 32 by suitable means 88 and is provided with an inwardly extending lip 90 having projections which are received in edge slots 92 in lever 78 and serve as a fulcrum therefor. End 94 of lever 78 engages the threaded projection portion 50 of valve member 46.

The slotted end 80 of lever 78 is provided with an inturned flange 96 around which is mounted one end of a helical coil spring 98. The coil spring 98 is positioned about adjustment screw 70 and has the other end mounted around a centrally recessed dome 100 of an annular member 102. The peripheral edge portion 104 of annular member 102 is provided with a projection forming a key 106 which extends into a keyway 108 formed in the wall of adjustment member 66 and extending parallel to the longitudinal axis thereof. The adjustment screw 70 is threadedly received by the inner wall of the recessed dome 100 and is adapted to move the annular member 102 longitudinally when the adjustment screw 70 is rotated by insertion of the appropriate tool in the slot 110 provided in the end of the screw.

An annular shoulder 112 is provided on the adjustment screw 70 and is adapted to engage boss 76. When the valve seat section 30 and the cover section 32 are assembled, the adjustment screw 70 is free to rotate but the end of the adjustment screw 70 may not be retracted from the recess 69.

A C-shaped washer 114 is crimped into an annular groove formed adjacent the end of the adjustment screw 70 and is adapted to engage the annular member 102 to prevent further extension of coil spring 98. An imperfect thread 116 is provided at the outer extremity of the threaded portion of the adjustment screw 70 and is adapted to limit outward movement of annular member 102 to prevent further compression of coil spring 98.

The valve seat section 30 is provided with a passageway 118 communicating with the innermost end of adjustment chamber 66 and air is bled from chamber 40 above diaphragm 34 through adjustment chamber 66 to passage 118 and subsequently out of a bleed connection 120 shown in dotted lines at the lower right corner of FIG. 1. An appropriately-sized orifice is drilled in the valve seat section or, alternatively, a plug (not shown) with an appropriately-sized orifice is fastened in bleed connection 120.

A pressure tap 122 is also provided in the valve seat section 30 and is connected to outlet 14 by means of a passageway 124 extending through the valve seat section 30 and the basic casing 16 to directly sense the outlet pressure of the control 10.

In operation, gas flows from a suitable source through the inlet 12 and past a thermoelectrically operated safety valve (not shown) to the gas cock 20. The gas cock 20 is manually operated by dial 22 to control gas flow to a pilot burner through appropriate passages (not shown) and to control gas flow through the end of gas cock 20 into passage 60. Gas flow into passage 60 is then regulated by valve 46 and proceeds through lower diaphragm chamber 42 and opening 62 to thermostatically operated valve 24. The thermostatically operated valve 24 is operable between open and closed positions by rod and tube assembly 26 responsive to an external condition, such as the temperature of water in a tank, to control fluid flow through outelt 14 to a main burner (not shown) situated in heating relationship to the water tank.

The diaphragm mounted valve 46 is responsive to inlet pressure from passage 60 and outlet pressure in the lower diaphragm chamber 42 to regulate the pressure in the control device 10 in the conventional manner.

Air is bled from chamber 40 above the diaphragm 34 through adjustment chamber 66, passage 118, and bleed connection 120. The drilled orifice in the valve seat section of the orificed plug (not shown) disposed in bleed connection 120 is utilized to retard the regulator response upon opening of the thermostatic valve 24 to prevent initial overgassing of the main burner. This orifice also provides a dampening effect to prevent regulator vibration at low flows on low capacity burner applications.

The gas pressure is adjusted merely by removing the temperature adjustment knob 28 and inserting a screw driver blade into slot 110 in adjustment screw 70 to rotate the same. Clockwise rotation of adjustment screw 70 will move the circular member 102 longitudinally toward the cover section 32 thereby compressing regulator spring 98. Key 106 disposed in keyway 108 prevents rotational movement of the circular member 102. The bias due to compression of regulator spring 98 pivots lever 78 in a clockwise direction to move valve member 46 away from valve seat 56, thereby increasing the gas pressure. Since the circular member 102 does not rotate, no torque is exerted on the regulator spring 98 to erroneously vary the bias thereof. The regulator spring 98 being mounted about inturned flange 96 on lever 78 and dome 100 on circular member 102 and the walls of adjustment chamber 66 being smooth, the regulator spring 98 is snagged neither on the threads of adjustment screw 70 nor on irregularities in the adjustment chamber 66.

It will be noted that the regulator spring 98 extends through adjustment chamber 66 which is parallel to and in juxtaposed relation with valve member 46 rather than in axial alignment therewith. This insures a longer, low-rate regulator spring 98 which provides better regulation characteristics and more precise adjustment of the gas pressure without increasing the thickness of the integrated control and pressure regulator over that of prior controls without pressure regulators. Moreover, the control dimensions in respect to height and width are substantially equal to such prior controls.

It will be understood that various modifications and variations, in structure as well as operation, may be ef-

We claim:
1. A gaseous fuel control assembly comprising:
   a pair of casing members joined together to form a hollow casing,
   a flexible diaphragm secured at its periphery between said casing members to divide the interior of the casing into an upper and lower chamber,
   an inlet and an outlet in said lower chamber defining a passage for fluid flow through said lower chamber,
   a valve element carried by the central portion of said diaphragm for controlling the rate of flow through said inlet,
   said valve element being movable by said diaphragm in response to increases in pressure in said lower chamber in a direction to decrease the flow through said inlet,
   a first abutment member secured to the central portion of said diaphragm on the opposite side thereof from said valve element,
   means defining an adjustment chamber in said casing adjacent said upper chamber and located outside the periphery of said diaphragm,
   said adjustment chamber being in communication with said upper chamber,
   an adjustment member movably mounted in said adjustment chamber,
   a second abutment carried by said adjustment member,
   means defining a fulcrum in said upper chamber,
   a lever positioned in said upper chamber with its ends disposed on opposite sides of said fulcrum,
   a spring having one end engaged with said second abutment and the other engaged with one end of said lever to bias an intermediate portion of said lever into abutting pivotal engagement with said fulcrum and pivot the other end of the lever into abutting engagement with said first abutment member to exert a biasing force on said diaphragm in a direction to increase the flow through said inlet, said lever thereby being held in assembled relationship with said fulcrum and abutment member by the reaction of said spring,
   said second abutment being selectively movable by said adjustment member to vary the biasing force on said diaphragm.

2. A gaseous fuel control assembly comprising:
   a hollow casing,
   a flexible diaphragm disposed in the casing dividing the interior thereof into a pair of chambers,
   an inlet and an outlet in one of said pair of chambers defining a passage for fluid flow through said one chamber,
   a valve element carried by the central portion of said diaphragm for controlling the rate of flow through said inlet,
   said valve element being movable by said diaphragm in a direction to decrease the flow through said inlet in response to increases in pressure in said one chamber,
   an adjustment chamber formed in said casing,
   a wall separating said adjustment chamber from the other of said pair of chambers,
   an opening in said wall providing communication between said other chamber and said adjustment chamber,
   means defining a fulcrum in said opening,
   a first abutment secured to the central portion of said diaphragm on the opposite side thereof from said valve element,
   a second abutment mounted in said adjustment chamber,
   a spring having one end engaged with one of said first and second abutments,
   a lever positioned in said opening with its ends projecting into said adjustment chamber and said other chamber with one end thereof engaged with the other end of said spring,
   said spring biasing an intermediate portion of the lever into pivotal engagement with said fulcrum pivoting the other end of the lever into abutting engagement with the other of said first and second abutments, thereby resiliently maintaining said lever in assembled relationship with said fulcrum and abutments,
   said spring reacting between said one of said first and second abutments and said lever to exert a biasing force on said diaphragm tending to move said valve element in a direction to increase the flow through said inlet,
   and adjustment means movably mounted in said adjustment chamber selectively movable to adjust the position of said second abutment to vary the biasing force acting on said diaphragm.

3. A gaseous fuel control assembly as defined in claim 2 further including:
   a keyway formed in the wall of said adjustment chamber with its longitudinal axis extending substantially parallel to the direction of movement of said valve element,
   said adjustment means comprising a threaded adjustment screw rotatably journalled at one end in said adjustment chamber,
   said second abutment comprising an annular member threadedly mounted on said adjustment screw,
   and a key projection formed on said annular member engaged with said keyway whereby rotation of said adjustment screw causes said annular member to travel along the length of the threaded portion of said adjustment screw.

4. A gaseous fuel control assembly as defined in claim 3 in which:
   said spring comprises a coil spring surrounding the threaded portion of said adjustment screw with said one end of said spring seated on said annular member, and said one end of said lever is seated on the other end of said spring and formed with an opening through which the adjustment screw extends,
   said fulcrum comprising a lip member extending into said opening formed with a pair of spaced projections,
   and a pair of slots formed in said intermediate portion of the lever engaged with said projection.

References Cited in the file of this patent
UNITED STATES PATENTS

| | | |
|---|---|---|
| 1,429,923 | Bosse et al. | Sept. 26, 1922 |
| 1,525,426 | Mueller et al. | Feb. 3, 1925 |
| 2,022,583 | Bicknell | Nov. 26, 1935 |
| 2,204,060 | Andersson | June 11, 1940 |

FOREIGN PATENTS

| | | |
|---|---|---|
| 539,021 | Italy | Feb. 3, 1956 |